UNITED STATES PATENT OFFICE 2,210,041

VAT DYESTUFFS AND METHOD OF PRODUCING THEM

Rudolf Robl, Ludwigshafen-on-the-Rhine, Germany, assignor to General Aniline & Film Corporation, a corporation of Delaware No Drawing. Application June 29, 1939, Serial No. 281,881. In Germany July 16, 1938

6 Claims. (Cl. 260—367)

The present invention relates to vat dyestuffs and a process of producing same.

I have found that new valuable vat dyestuffs can be obtained by condensing coronene with phthalic anhydride to form ortho-carboxybenzoyl-coronenes and further condensing the latter by heating or by treatment with agents splitting off water.

Coronene is represented by the formula

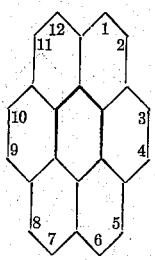

The condensation of the coronene with phthalic anhydride is effected in known manner by the Friedel-Crafts reaction while using condensing agents such as aluminium chloride or iron chloride. The coronene is preferably dissolved or suspended in an indifferent solvent, as for example carbon disulphide, tetrachlorethane, monochlorbenzene or ortho-dichlorbenzene, the phthalic anhydride and the condensing agent are then added in any sequence and the mixture is heated to from about 80° to 100° C. The reaction mixture is worked up in the usual manner and the ortho-carboxybenzoyl-coronenes are purified by dissolution and precipitation with sodium carbonate and acid. If desired it may be further purified by recrystallization or by repeated dissolution in aqueous alkalies or ammonia solution and precipitation with acids. By choosing appropriate amounts of phthalic acid and condensing agent, such as aluminium chloride, it is possible to condense one or more molecules of phthalic acid with one molecule of coronene. It is advantageous to work with such amounts that 3 molecules of phthalic anhydride are condensed with 1 molecule of coronene to form tri-ortho-carboxybenzoyl-coronene.

The resulting ortho-carboxybenzoyl-coronenes may readily be converted into vattable products by treatment with agents splitting off water, whereby ring closure takes place. This is effected for example by heating the acids above the melting point. It is advantageous to carry out the ring closure by fusing the ortho-carboxybenzoyl-coronenes with aluminium chloride, to which if desired a flux, such as common salt, may be added. The treatment may also be carried out with concentrated sulphuric acid or its derivatives or with concentrated phosphoric acid. It is especially suitable to use methyl-sulphuric acid because a sulphonation does not then take place.

The condensation of the coronene with phthalic anhydride and the ring closure may also be carried out in one working operation, for example by heating the coronene with an excess of phthalic anhydride with an addition of aluminium chloride for some time at temperatures of from about 160° to 220° C., introducing the reaction product into water and removing the phthalic acid by boiling up with water.

In the said manner brown to brown-red colored products are obtained which may readily be vatted with caustic soda solution and sodium hydrosulphite; they dye cotton orange-red to red shades from a red-violet or blue-red vat.

The following examples will further illustrate how the said invention may be carried out in practice but the invention is not restricted to these examples. The parts are by weight.

Example 1

66 parts of coronene are dissolved in 2000 parts of ortho-dichlorbenzene by heating. After cooling to about 50° C., 160 parts of anhydrous aluminium chloride are introduced into the mixture while stirring well and then 98 parts of phthalic anhydride in small batches during half an hour. The temperature is then raised to 80° C., the whole is stirred for another hour, the mixture poured onto ice and the dichlorbenzene distilled off with steam. The resulting yellow-brown reaction product is dissolved in sodium carbonate solution, the small amount of undissolved constituents being filtered off. The filtrate is acidified with dilute hydrochloric acid and the precipitated tri-ortho-carboxybenzoyl-coronene filtered off by suction. After drying, the acid is boiled with toluene, filtered by suction while hot and dried in order to remove small amounts of readily soluble bye-products.

90 parts of the tri-ortho-carboxybenzoyl-coronene thus obtained are introduced into 450 parts of methyl-sulphuric acid and heated to 110° C. for about 15 minutes while stirring. The mixture is then poured into water and the deposited product is filtered off by suction, washed with water until the washing water no longer has an acid reaction and dried. The product, which probably has the composition

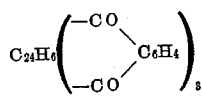

does not melt up to 350° C.; it dissolves in concentrated sulphuric acid to give a green coloration. It is soluble with difficulty in the usual organic solvents. By heating with 3 per cent caustic soda solution and sodium hydrosulphite, a violet-red vat is formed from which cotton is dyed red shades.

*Example 2*

3.3 parts of crude coronene are heated together with 15 parts of phthalic anhydride to 160° C. while stirring. After adding 8 parts of aluminium chloride the temperature rises spontaneously to about 220° C. The mixture is stirred at this temperature until the mass has become solid, which is the case after about 15 minutes. The reaction product is first treated with water, then boiled up with dilute hydrochloric acid, freed from acid by washing with water and dried. The resulting product dissolves in concentrated sulphuric acid giving a brown-olive-green coloration; it dyes cotton red-brown shades from a violet-red vat.

By boiling with solvents, as for example ortho-dichlorbenzene, the product may be separated into a more readily and more difficultly soluble fraction. The more readily soluble portion probably represents a diphthaloyl-coronene, dissolves in concentrated sulphuric acid giving a dark brown coloration and dyes cotton orange shades from a brown-red vat. The more difficultly soluble portion dissolves in concentrated sulphuric acid giving a green coloration and dyes cotton rose shades from a violet-red vat.

*Example 3*

33 parts of crude coronene are heated together with 1000 parts of tetrachlorethane for a short time to boiling and after cooling to 50° C. there are added to the mixture 150 parts of aluminium chloride and then, a little at a time, 89 parts of phthalic anhydride while stirring. The whole is then heated to from 70° to 80° C. for about an hour, allowed to cool, poured into water, the tetrachlorethane distilled off with steam and the reaction product treated with hot sodium carbonate solution. The undissolved constituents are filtered off from the sodium carbonate solution and the latter acidified with dilute hydrochloric acid. The precipitated ortho-carboxybenzoyl-coronenes are filtered off by suction, washed and dried. The acids commence to sinter at 235° and melt at 250° C.

30 parts of the resulting ortho-carboxybenzoyl-coronenes are introduced at 90° C. into 150 parts of methyl-sulphuric acid. The mixture is stirred for about a quarter of an hour at the said temperature, then poured into water and the deposited product is filtered off by suction, washed and dried. By recrystallization from solvents, as for example ortho-dichlorbenzene or nitrobenzene, it may be separated into a more readily soluble and a more difficultly soluble portion. The more readily soluble portion represents a diphthaloyl-coronene, which dyes cotton orange shades from a brown-red vat and the more difficultly soluble portion represents a tri-phthaloyl-coronene which dyes cotton red shades from a blue-red vat.

What I claim is:

1. A process of producing vat dyestuffs of the general formula

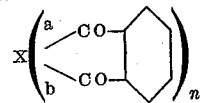

wherein X stands for the radical of coronene, $n$ for an integer up to 3, the linkages $a$ and $b$ leading to ortho-positions of the said coronene, which comprises treating ortho-carboxybenzoyl-coronenes of the general formula

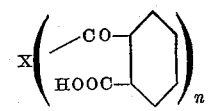

wherein X and $n$ have the meanings mentioned above, with dehydrating agents.

2. A process of producing vat dyestuffs of the general formula

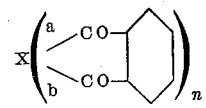

wherein X stands for the radical of coronene, $n$ for an integer up to 3, the linkages $a$ and $b$ leading to ortho-positions of the said coronene, which comprises treating ortho-carboxybenzoyl-coronenes of the general formula

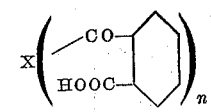

wherein X and $n$ have the meanings mentioned above, with methyl-sulphuric acid.

3. A process of producing vat dyestuffs of the general formula

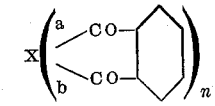

wherein X stands for the radical of coronene, $n$ for an integer up to 3, the linkages $a$ and $b$ leading to ortho-positions of the said coronene, which comprises treating ortho-carboxybenzoyl coronenes of the general formula

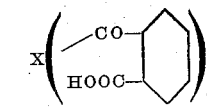

wherein X and $n$ have the meanings mentioned above, with anhydrous aluminium chloride.

4. A vat dyestuff of the general formula

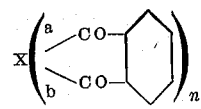

wherein X stands for the radical of coronene, $n$ for an integer up to 3, the linkages $a$ and $b$ leading to ortho-positions of the said coronene.

5. A vat dyestuff of the general formula

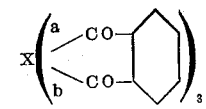

wherein X stands for the radical of coronene, the linkages $a$ and $b$ leading to ortho-positions of the coronene, having a melting point about 350° C., dissolving in concentrated sulphuric acid to give a green coloration and dyeing vegetable fibres red shades from a violet-red vat.

6. A vat dyestuff of the general formula

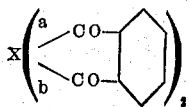

wherein X stands for the radical of coronene, the linkages $a$ and $b$ leading to ortho-positions of the said coronene, dissolving in concentrated sulphuric acid giving a dark brown coloration and dyeing vegetable fibres orange shades from a brown-red vat.

RUDOLF ROBL.